(12) United States Patent
Gilan

(10) Patent No.: US 11,629,987 B2
(45) Date of Patent: Apr. 18, 2023

(54) ACCURATE VOLUME AND TEMPERATURE DISPENSING HEAD

(71) Applicant: IO Tech Group Ltd., London (GB)

(72) Inventor: Ziv Gilan, Kfar-harif (IL)

(73) Assignee: IO Tech Group Ltd., Modiin (IL)

( * ) Notice: Subject to any disclaimer, the term of this patent is extended or adjusted under 35 U.S.C. 154(b) by 0 days.

(21) Appl. No.: 17/449,722

(22) Filed: Oct. 1, 2021

(65) Prior Publication Data

US 2022/0120598 A1     Apr. 21, 2022

Related U.S. Application Data

(60) Provisional application No. 63/092,134, filed on Oct. 15, 2020.

(51) Int. Cl.
   *G01F 11/38*      (2006.01)
   *B67D 3/00*       (2006.01)

(52) U.S. Cl.
   CPC ............ *G01F 11/38* (2013.01); *B67D 3/0003* (2013.01); *B67D 3/0009* (2013.01);
   (Continued)

(58) Field of Classification Search
   CPC ..... G01F 11/38; B67D 3/0003; B67D 3/0009; B67D 3/0016; B67D 3/0038;
   (Continued)

(56) References Cited

U.S. PATENT DOCUMENTS

| | | | | |
|---|---|---|---|---|
| 2,741,931 A | * | 4/1956 | Sills | F01L 1/12 |
| | | | | 123/90.26 |
| 4,007,757 A | * | 2/1977 | Emmert | F16K 31/524 |
| | | | | 137/868 |

(Continued)

OTHER PUBLICATIONS

International Preliminary Report on Patentability dated Aug. 24, 2022, from the IPEA/European Patent Office, for International Patent Application No. PCT/IB2021/059060 (filed Oct. 1, 2021), 16 pgs.

(Continued)

*Primary Examiner* — Paul R Durand
*Assistant Examiner* — Randall A Gruby
(74) *Attorney, Agent, or Firm* — Ascenda Law Group, PC

(57) ABSTRACT

Systems and methods for the injection/dispensing of fluid material in a volumetrically accurate and repeatable manner via an injection cell that interconnects two reservoirs of the fluid material. The injection cell has a normally closed dispensing valve that is opened for dispensing of the fluid material during a compression cycle, and closed during a return cycle. Opening and closing of the dispensing valve is effected using either or both of pressurized air and/or a motorized linkage. During the compression cycle, independent longitudinal displacements of a piston cylinder and a piston within the injection cell act to first open the dispensing valve and subsequently eject fluid material within the piston cylinder via the opened dispensing valve. The piston cylinder and piston are returned to an initial state that facilitates reloading of the injection cell from the reservoirs and closes the dispensing valve during a return cycle.

20 Claims, 10 Drawing Sheets

(52) U.S. Cl.
CPC ......... *B67D 3/0016* (2013.01); *B67D 3/0038*
(2013.01); *B67D 2210/00104* (2013.01)
(58) Field of Classification Search
CPC ......... B67D 2210/00104; F16K 31/523; F16K
31/524; F16K 31/52475; F16K 3/02;
F16K 3/02584
See application file for complete search history.

(56) References Cited

U.S. PATENT DOCUMENTS

| | | | | |
|---|---|---|---|---|
| 4,211,345 | A * | 7/1980 | Taubenmann | B01F 35/7174 |
| | | | | 277/435 |
| 4,862,696 | A * | 9/1989 | Runkvist | G01F 11/021 |
| | | | | 417/511 |
| 5,088,631 | A * | 2/1992 | Torterotot | G01F 11/029 |
| | | | | 222/255 |
| 5,480,063 | A | 1/1996 | Keyes et al. | |
| 2010/0230439 | A1* | 9/2010 | Wootton | B05C 11/1036 |
| | | | | 222/145.5 |
| 2018/0321069 | A1* | 11/2018 | Gan | G01F 11/10 |

OTHER PUBLICATIONS

International Search Report and Written Opinion dated Jan. 5, 2022, from the ISA/European Patent Office, for International Patent Application No. PCT/IB2021/059060 (filed Oct. 1, 2021), 13 pgs.

* cited by examiner

ACCURATE VOLUME AND TEMPERATURE DISPENSING HEAD

RELATED APPLICATIONS

This is a NONPROVISIONAL of, claims priority to, and incorporates by reference U.S. Provisional Application No. 63/092,134, filed 15 Oct. 2020.

FIELD OF THE INVENTION

The present invention is related to systems and methods for dispensing accurate volumes of flowable substances from a nozzle-based head, and more specifically to such methods and systems for obtaining an accurate volume of dispensed material at a desired temperature and in a repeatable manner.

BACKGROUND

There are various types of dispensing apparatuses. One such type is positive displacement fillers. These devices employ a cylinder and piston arrangement, which contacts and dispenses a fluid material. Typically, the fluid material enters the cylinder as the piston is in its upward stroke, creating a vacuum in the cylinder which draws in the fluid material through an inlet port. The downward stroke of the piston expels the fluid material through an outlet port. The process can then be repeated. Other embodiments of positive displacement fillers also exist, such as those using rotary pumps. While these fillers are popular due to their speed and accuracy, their application is limited. These devices are very difficult to clean, and typically must be disassembled to be sterilized. Also, since the device contacts the fluid material (e.g., at the piston head and within the piston cylinder), contamination is a constant risk.

Another type of dispensing apparatus is the time/pressure filler. These devices typically include a fluid chamber that is held under constant pressure. Fluid material is dispensed through a discharge line, which is controlled by a pinch type valve. The valve is opened for a precise amount of time to dispense an amount of the fluid material. Since the pressure is held constant, and the time interval is constant, the amount of fluid material dispensed should also be constant over repeated dispensing operations. However, due to variances in the equipment and deformation of the discharge tube over time, these systems are less accurate than required for many applications.

A third type of dispensing apparatus is a volumetric dispensing apparatus, an example of which is shown in U.S. Pat. No. 5,480,063. These devices measure and dispense a predetermined volume of fluid material. They can be highly accurate and also avoid problems of contamination common with positive displacement apparatus since there are no moving parts in contact with the fluid material. However, they do have shortcomings. The accuracy of these volumetric dispensing apparatus depends on the viscosity of the fluid material remaining constant throughout the dispensing period. If the viscosity of the fluid material changes, the dispensed volume may vary over a number of dispensing operations. In typical usage then, these systems are kept in a controlled environment, e.g., one in which temperature and humidity are maintained relatively constant, so that the viscosity of the fluid material also remains constant, allowing for accurate and repeatable dispensing results. However, setting up and maintaining such a controlled environment can be expensive and impractical. Some facilities may not have the required space or equipment to install the equipment required to maintain such an environment. Others may find that the cost of establishing and maintaining such an environment is prohibitive.

Despite the existing solutions for dispensing accurate volumes of fluid materials, problems are still encountered. Many of these difficulties relate to the need for combining a number of necessary properties in a single device, for example high dispensing accuracy, accurate temperature control, simple adjustment, and the removal of air bubbles (e.g., from associated plumbing arrangements), mostly for high viscosity materials.

SUMMARY OF THE INVENTION

In various embodiments, the present invention provides systems and methods for the injection/dispensing of fluid material in a volumetrically accurate and repeatable manner via an injection cell that interconnects two reservoirs of the fluid material. The present invention further provides systems and methods that enable injection of fluid material in a volumetrically accurate and repeatable manner via an injection cell that interconnects two reservoirs of the fluid material. The injection cell has a normally closed valve that is opened for dispensing of the fluid material during a compression cycle of the injection cell.

In one embodiment, the present invention provides a dispensing system having an injection cell that fluidly interconnects two reservoirs of a fluid material via a defined volume of the injection cell and methods for operating such a dispensing system. The injection cell has a normally closed valve that is configured to open during a compression cycle in which the injection cell is configured to dispense the fluid material in an amount consistent with the defined volume. For example, during the compression cycle the injection cell may operate using an air piston and/or a motor-driven arrangement to displace a piston cylinder and a piston carried therein to open the normally closed valve and dispense the fluid material out of the cell via the valve when in an opened state. The piston cylinder and the piston are configured for longitudinal displacement within the injection cell separately (e.g., during the compression cycle) or together (e.g., during a return cycle). A controllable latch of the dispensing system operably determines which of the piston cylinder and/or the piston undergoes longitudinal displacement within the injection cell during the compression cycle. The controllable latch, i.e., its position with respect to other elements of the dispensing system, may thus dissociate or conjugate movement of the piston cylinder and the piston within the injection cell. The normally closed valve may be opened and closed in a controllable manner, e.g., through the displacement of the piston cylinder, using the air piston and/or with a motorized opening mechanism.

According to one embodiment of the invention, the two reservoirs are fluidly connected inside the injection cell in one or more places to facilitate mixing of the fluid material. Additionally, one or more inlets from each reservoir may be configured to create a mixing of the fluid material as it enters into the injection cell. The amount of fluid material in either or both of the reservoirs may be measured by mechanical, electrical, optical or other means. Further, additional reservoirs may be included in the dispensing system, some of which may contain additional fluid materials which are mixed together within the injection cell (i.e., within a defined volume therein). The reservoirs may be contained within a temperature control element, e.g., individually or collectively, for example, one or more water jackets or Peltier elements.

These and further embodiments of the invention are described in greater detail below.

BRIEF DESCRIPTION OF THE DRAWINGS

The present invention illustrated by way of example, and not limitation, in the figures of the accompanying drawings, in which.

DETAILED DESCRIPTION

Figure 1A:
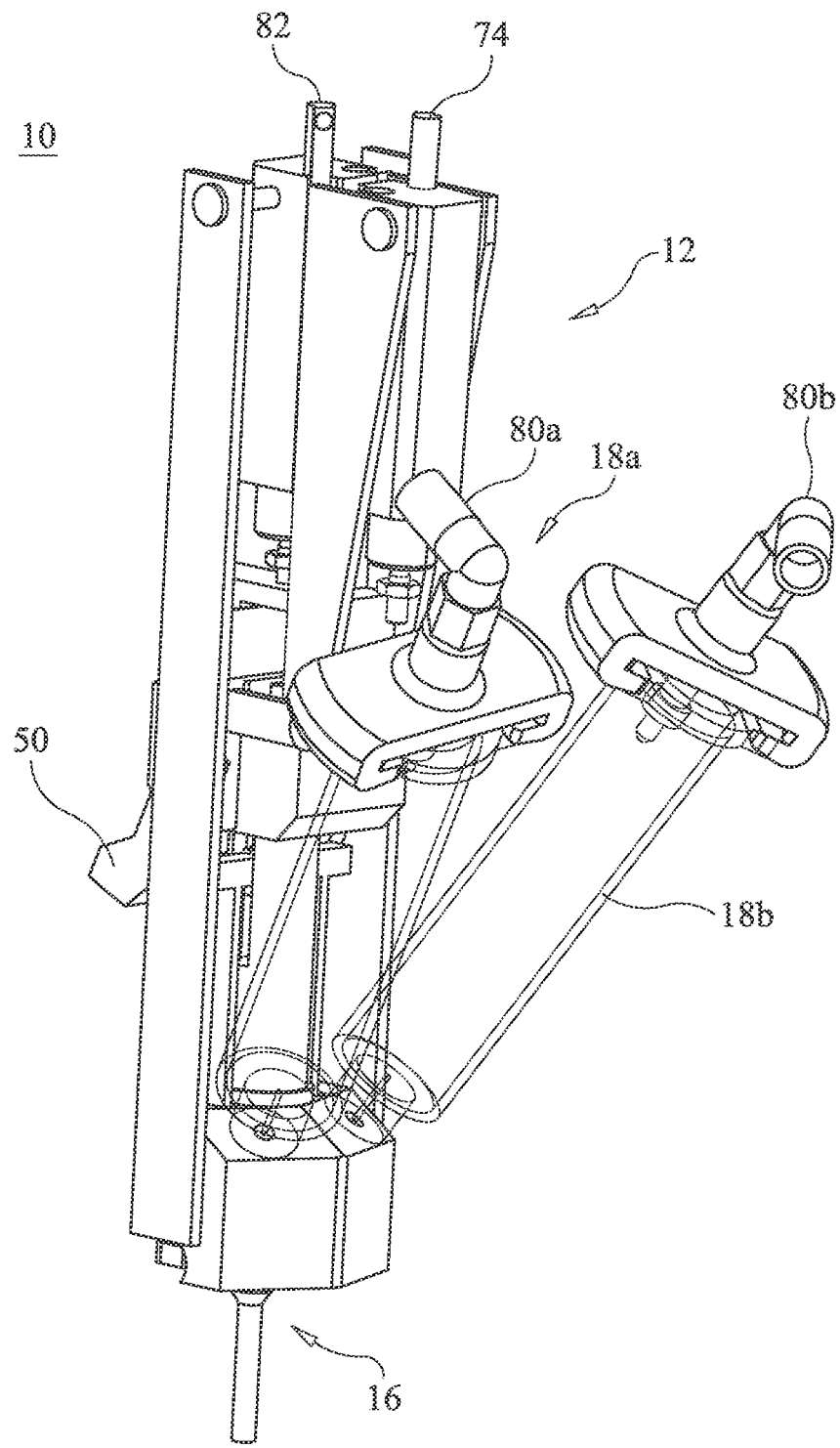
FIGS. 1A-1C provide schematic views of a dispensing system configured in accordance with embodiments of the invention from various perspectives.

Before describing the invention in detail, it is helpful to present an overview. In various embodiments, the present invention provides a system and method for controlling the temperature of a fluid material (e.g., a solder paste) in a volumetric dispensing apparatus, without the need for a controlled ambient environment. A reservoir used to hold the fluid material prior to dispensing is maintained at a constant temperature using a temperature-controlled surround, such as a water jacket. This ensures uniform properties of the to-be-dispensed fluid material, such as viscosity and density, thereby ensuring that accurate and repeatable volumes of the fluid material will be dispensed over a number of dispensing cycles. A dispenser configured according to embodiments of the present invention is able to dispense an accurate volume of the fluid material at a desired temperature in a very reproducible way.

The dispensing process makes use of two (or more) reservoirs of the same fluid material that are connected by (through) an injection cell having a definite volume. For purposes of explanation and illustration, a two-reservoir system will be discussed, however, in other embodiments additional reservoirs may be present. Also, in the embodiments of the invention described below, the two reservoirs each have a single exit port into a chamber of the injection cell, however, in other instances additional exit ports for each reservoir into the chamber of the injection cell may be present. The to-be-dispensed fluid material is able to flow from one reservoir to the other through the chamber of the injection cell, ensuring that the chamber within the injection cell is filled with fluid material at any point in the dispensing process and also providing for mixing of the fluid material so that it does not self-separate. In other embodiments of the invention, multiple reservoirs can be used for the dispensing of a single material or multiple materials, for example that are mixed inside the chamber of the injection cell or in an inlet to the chamber of the injection cell. That is, the different reservoirs may contain different fluid materials which are mixed together in the chamber of the injection cell prior to being dispensed.

As further discussed below, in some embodiments of the invention the injection cell has a piston and a piston cylinder, and both can be moved longitudinally and independently within the injection cell, for instance, by an air piston. When both the piston cylinder and the piston are at a first extent of their travel within the injection cell (e.g., an upper extent), injection piston valves at the bottom of the injection cell are released (i.e., are not biased open) and the cell's exit valve is closed, preventing the dispensing of fluid material. While the dispensing of fluid material from the injection cell is prevented, the fluid material can nevertheless flow from one reservoir to the other through the chamber of the injection cell. For example, when pressure (air or liquid) is applied to one reservoir, fluid material from that reservoir can flow into the chamber of the injection cell, and when the chamber of the injection cell is filled, excess fluid material will continue to flow to the other reservoir.

For dispensing of fluid material from the injection cell, a force is applied to the injection piston valves at the bottom of the injection cell, biasing the injection piston valves apart and opening the injection cell's exit valve. The force is applied, in one embodiment, via an air piston that acts on a compress flange to move the piston cylinder downward toward the bottom of the injection cell. When the piston cylinder (more particularly, valve arms that are displaced by movement of the piston cylinder) engages lateral flanges of the injection piston valves at the bottom of the injection cell, the injection cell's exit valve opens. Displacement of the piston cylinder in the downward direction also causes the piston cylinder to enter into the chamber of the injection cell until it reaches the bottom of the chamber, enclosing or trapping a portion of the fluid material within the piston cylinder. The piston may then be separately displaced downwards, and the fluid material contained in the piston cylinder dispensed from the injection cell via the open exit valve.

In some embodiments of the invention, the piston cylinder and the piston can be actuated by the same air piston and an additional mechanical aid (e.g., a linkage to a motor) may be added from the side to assist in moving the two up and down, to reduce the volume of the system.

In some embodiments of the invention, the inlets to the chamber of the injection cell from the fluid material reservoirs are machined so as to enhance mixing of the fluid material. For instance, helical inlets may be used, or some distortions added to otherwise smooth bore inlets to ensure good mixing of the material and to avoid material phase separation.

In some embodiments of the invention, temperature control means are added around the dispensing system. For example, a water (or other liquid or gas) jacket or a Peltier element can be used to control the temperature and/or humidity inside the injection cell to obtain constant conditions of the fluid material and to prolong its pot life.

Figure 1B:
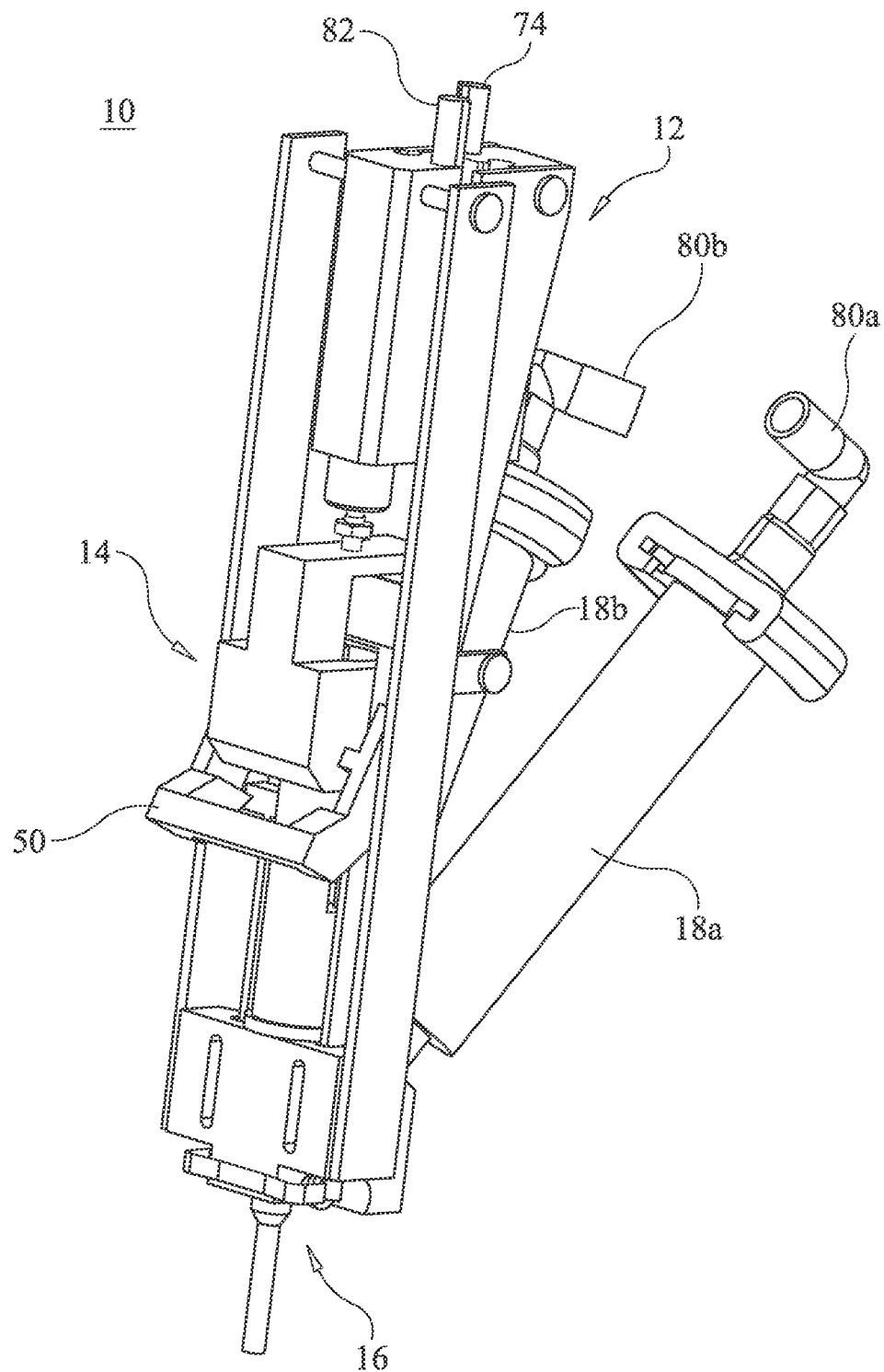
Figure 1C:
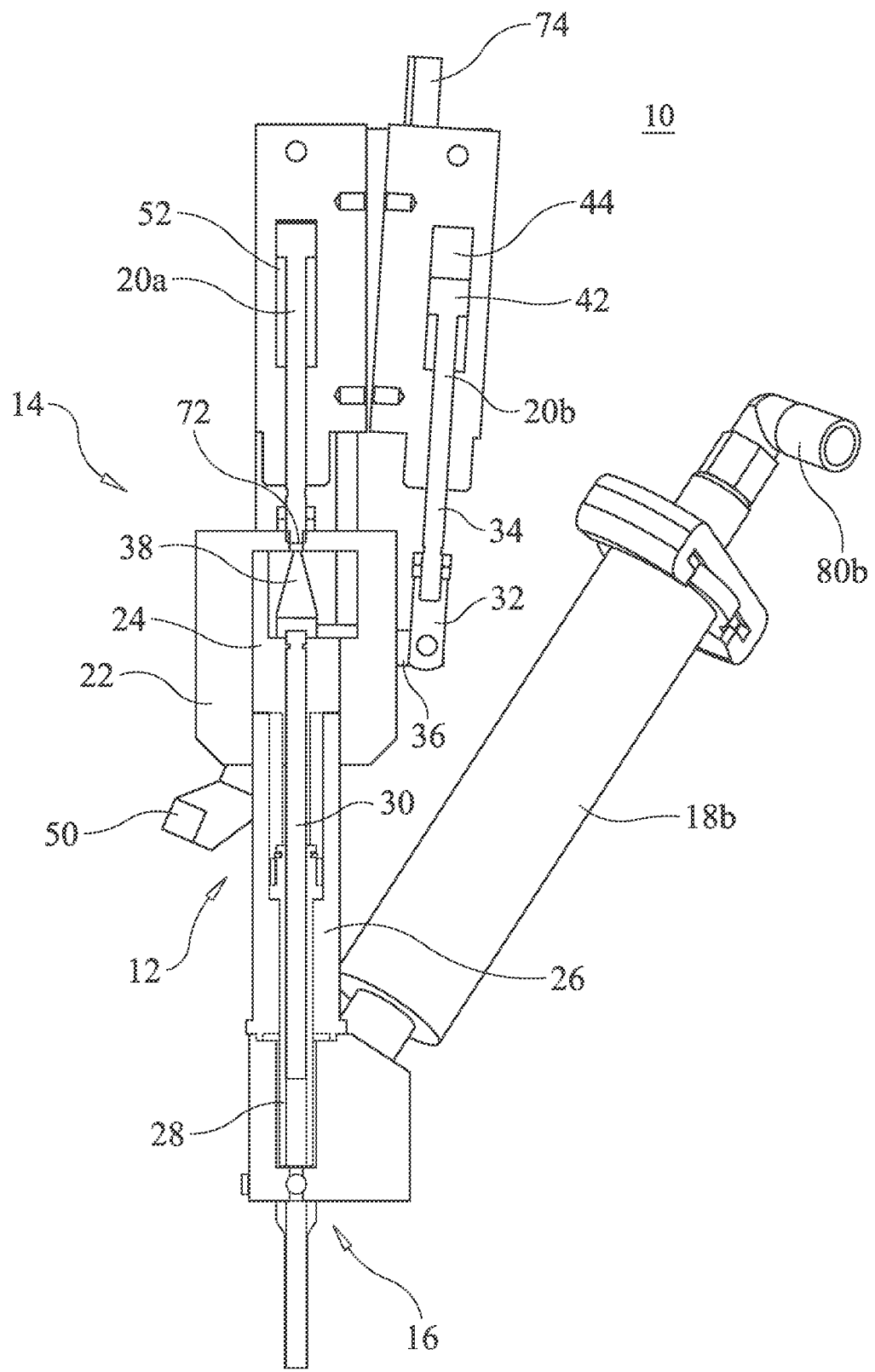

Referring now to FIGS. 1A-1C, schematic views of a dispensing system 10 configured in accordance with an embodiment of the invention are illustrated. FIG. 1A shows a front perspective view of dispensing system 10 and FIG. 1B shows a rear perspective view of dispensing system 10. FIG. 1C illustrates a side cross-sectional view of dispensing system 10. In the illustrated embodiment, dispensing system 10 includes:
 a. an injection cell 12 that can be emptied in a controlled manner by air pressure;
 b. an air pressure mechanism 14;

c. a dispensing valve 16; and d. a pair of reservoirs 18*a*, 18*b* that are fluidly interconnected with one another through the injection cell 12.

Referring to FIG. 1C, the upper end of dispensing system 10 includes two air pistons: a compress air piston 20*a*, and a latch air piston 20*b*. As the name implies, compress air piston 20*a* is actuated to force liquid material out of the injection cell 12 (e.g., to dispense liquid material). Latch air piston 20*b* is used in connection with the reload mechanism for the injection cell 12.

Figure 2:
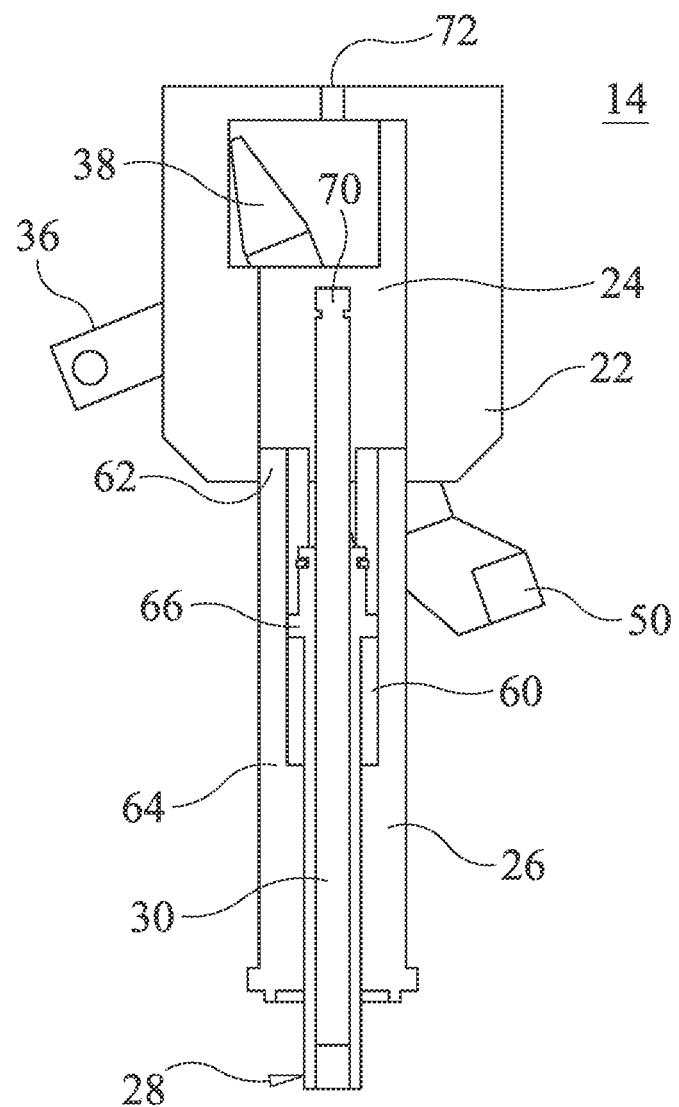
FIG. 2 is a side cross-sectional view illustrating various components of an air pressure mechanism of the dispensing system shown in FIGS. 1A-1C.

FIG. 2 is a side cross-sectional view illustrating various components of the air pressure mechanism 14 in greater detail. The mechanism includes a compress flange 22, which has a hollow, cylindrical interior 24 that is circumferentially disposed over an outer perimeter of one end of a cylinder holder 26. As will be explained further below, compress flange 22 moves bidirectionally in a longitudinal direction (under the influence of compress air piston 20*a*) over a stationary cylinder holder 26 when dispensing operations take place.

Figure 5A:
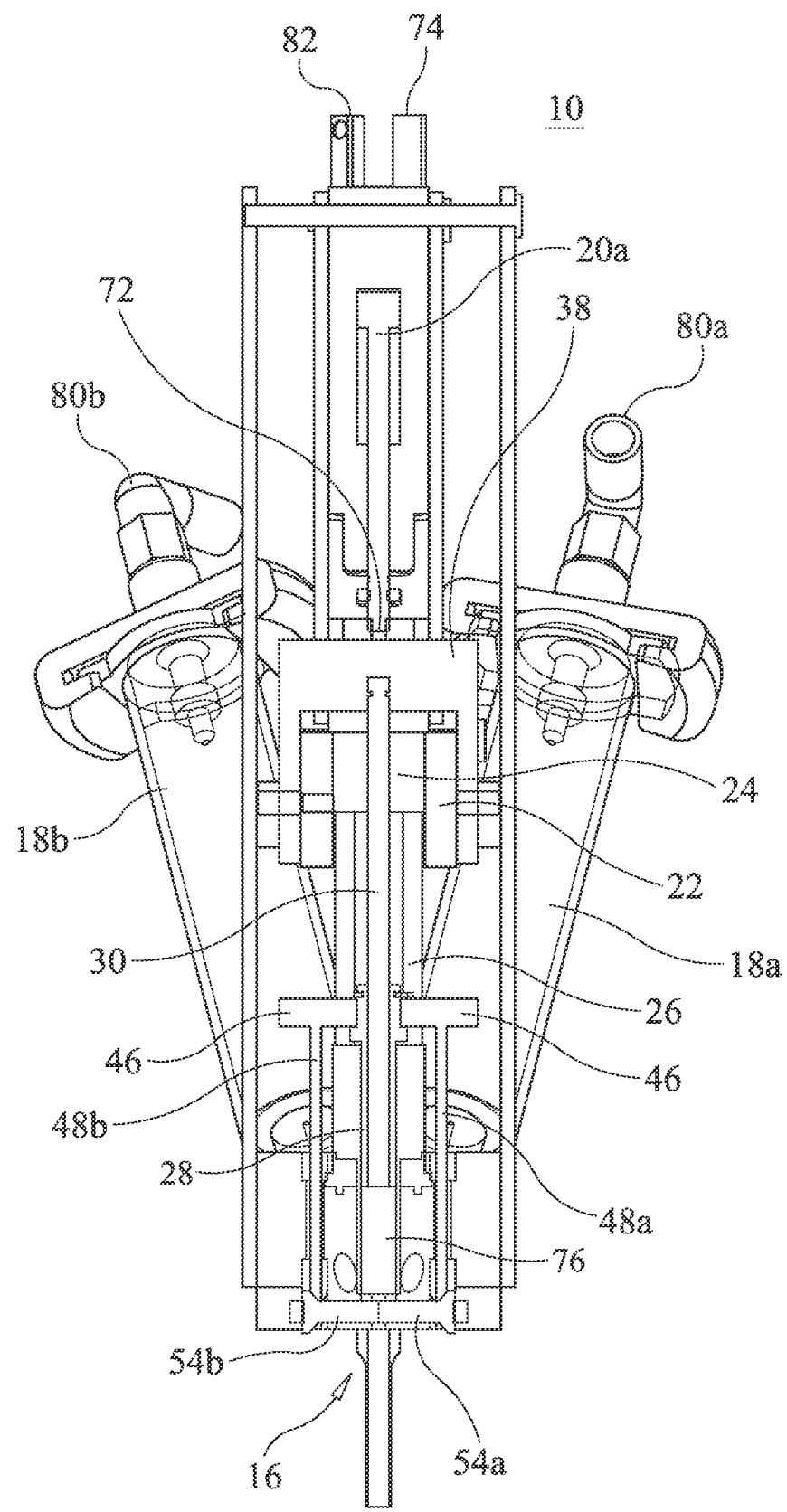
FIGS. 5A-5C illustrate aspects of opening and closing of a dispensing valve of the dispensing system in accordance with embodiments of the present invention.
Figure 5C:
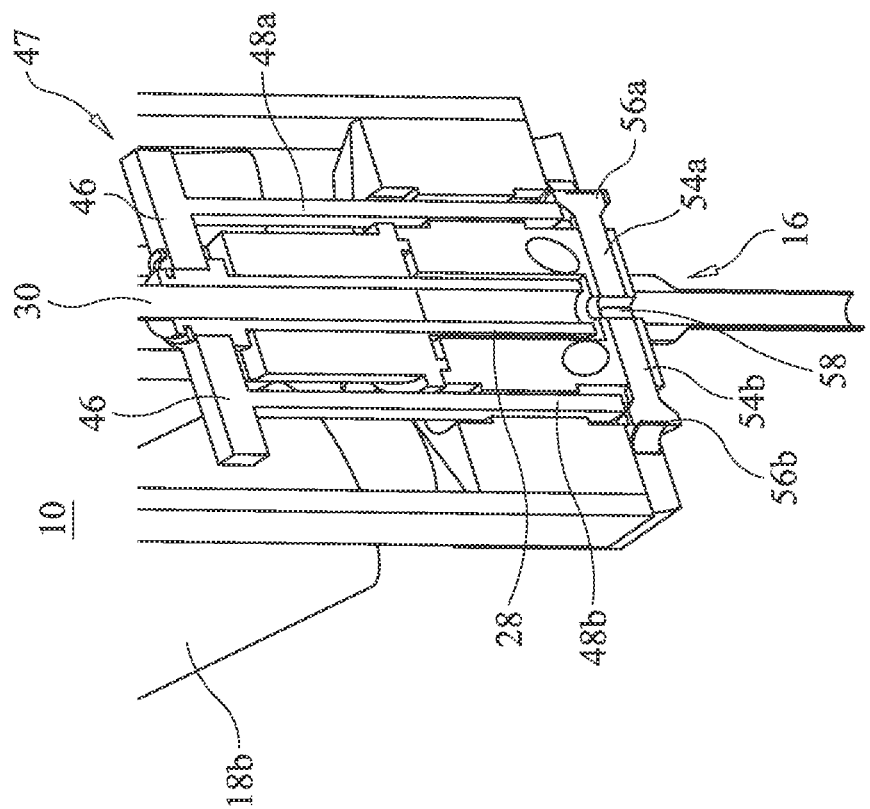

Cylinder holder 26 circumferentially supports a hollow, circular piston cylinder 28, within which is disposed a piston 30. As shown, cylinder holder 26 includes a cavity 60 that extends longitudinally from an upper end 62 of the cylinder holder 26 to a midpoint 64 thereof. A plunger portion 66 near an upper end of piston cylinder 28 is disposed within cavity 60 of the cylinder holder 26. Referring briefly to FIG. 5C, arms 46 of a cylinder latch lock 47 rest on the plunger portion 66 of the piston cylinder 28. When compress air piston 20*a* is actuated in a downward stroke (e.g., by pressurized air), it acts on an upper surface of the compress flange 22 at a point 72 and forces the compress flange 22 downwards, such that the compress flange 22 slides over the outer surface of the stationary cylinder holder 26. A bottom portion of the compress flange 22 contacts the arms 46 of cylinder latch lock 47, forcing the plunger portion 66 of piston cylinder 28 down within cavity 60. Consequently, the piston cylinder 28 is displaced longitudinally downwards in the cylinder holder 26. Conversely, when compress air piston 20*a* is actuated in an upward stroke and the cylinder latch lock 47 is engaged with plunger portion 66 of piston cylinder 28, compress flange 22 is raised and the piston cylinder 28 is displaced longitudinally upwards in cavity 60 of the cylinder holder 26. In this way and as discussed further below, the piston cylinder 28 can be moved longitudinally up and down to close or open, respectively, the dispensing valve 16 of dispensing system 10.

During the compression cycle, the longitudinal displacement of the piston cylinder 28 within cylinder holder 26 is independent of the movement of piston 30 within the piston cylinder 28. Stated differently, piston 30 is independently longitudinally displaceable within the piston cylinder 28, e.g., in response to the motion of compress air piston 20*a* acting on an upper end 70 of piston 30. Whether or not the motion of compress air piston 20*a* acts to displace only the piston cylinder 28 or only the piston 30 depends on the position of piston latch 38, which is controlled by the operation of the latch air piston 20*b*.

Referring to FIGS. 1C and 2, the latch air piston 20*b* is connected by a cam 32 at its distal end 34 to a flange 36 of the piston latch 38. The piston latch 38 is rotatably connected (e.g., by a pin 40—see FIGS. 4A-4C) to compress flange 22 at the sides of the compress flange. The piston latch 38 moves rotationally about the pin 40 with respect to the compress flange 22, according to the action of the latch air piston 20*b*.

Figure 4A:
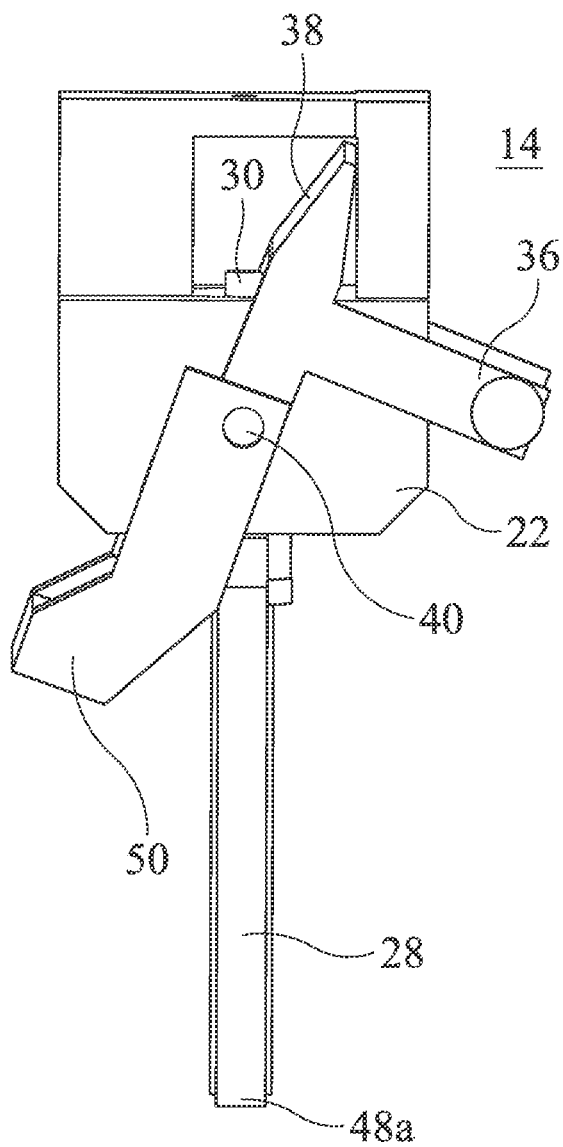
FIGS. 4A-4C highlight operational orientations of components of the air pressure mechanism in accordance with embodiments of the present invention.
Figures 4B, 4C:
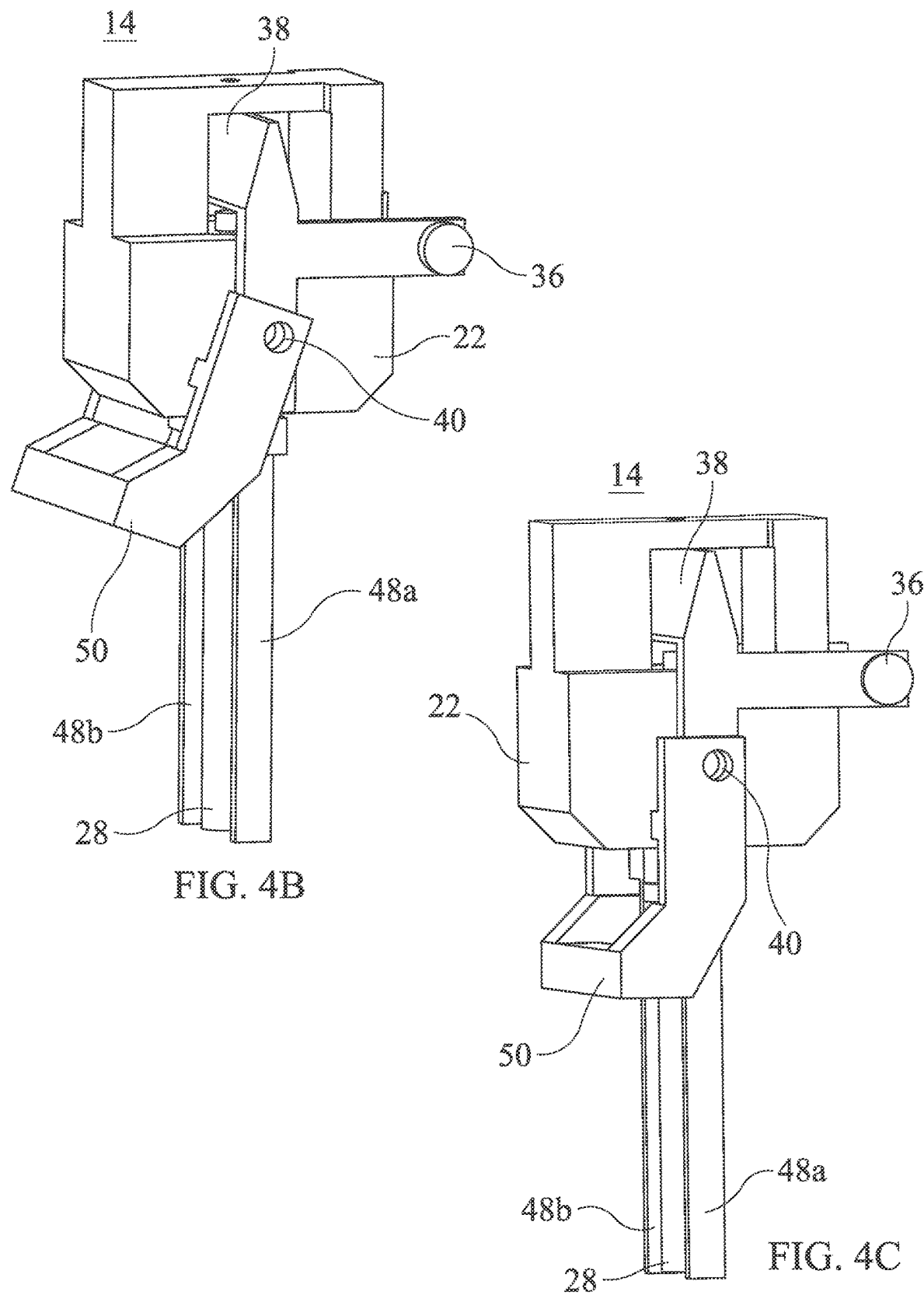

With the latch air piston 20*b* in its unextended position (e.g., with its piston head 42 positioned at or near the top of the latch air piston cylinder 44), piston latch 38 is closed (see FIGS. 4B and 4C). When piston latch 38 is closed, compress air piston 20*a* acts on compress flange 22 at point 72 (see FIG. 1C) and on the wedge-shaped piston latch 38. Because piston latch 38 is positioned above piston 30, the piston latch 38 acts on piston head 70, forcing the piston 30 longitudinally downwards in cylinder holder 26. As explained further below, this will cause material to be dispensed via the open dispensing valve 16.

When pressurized air is introduced into latch air piston cylinder 44, e.g., via inlet 74, latch air piston 20*b* moves from its compressed position to its extended position. This linear motion of the latch air piston 20*b* is converted to rotational motion of the piston latch 38 about pin 40, because cam 32 couples the distant end 34 of the latch air piston 20*b* to flange 36 of the piston latch 38. When cam 32 is driven downward by the latch air piston 20*b*, cam 32 acts on the flange 36 to open the piston latch 38.

With latch air piston 20*b* in its extended position (e.g., with its piston head 42 positioned at or near the bottom of latch air piston cylinder 44 and latch air piston 20*b* extended), piston latch 38 is open (see FIG. 4A). When piston latch 38 is open, compress air piston 20*a* acts on compress flange 22 at point 72, but this time, piston latch 38 is not positioned above piston 30, hence, the motion of compress flange 22 does not cause the piston latch 38 to engage piston 30 and force it downwards. Instead, as discussed above, when the downward stroke of compress air piston 20*a* forces the compress flange 22 downwards, the compress flange 22 slides over the outer surface of the stationary cylinder holder 26 and contacts the arms 46 of cylinder latch lock 47, forcing the plunger portion 66 of piston cylinder 28 down within cavity 60 and displacing the piston cylinder 28 longitudinally downwards in the cylinder holder 26.

The return of the piston cylinder 28 and piston 30 to their unextended positions may be coordinated (e.g., by an upward stroke of compress air piston 20*a*) when a return latch 50 is in its closed position (as shown in FIG. 4C). That is, when return latch 50 is closed, cylinder latch lock 47 is engaged and piston 30 and piston cylinder 28 move together when compress air piston 20*a* displaces the compress flange 22 upwards. When return latch 50 is in its open position (as shown in FIGS. 4A, 4B), piston 30 and piston cylinder 28 move independently of one another, as discussed above. This allows for independent downward longitudinal displacement of the piston cylinder 28 to effect opening of the dispensing valve 16 prior to downward longitudinal displacement of piston 30 to expel fluid material from the dispensing system 10 via the dispensing valve 16 while accommodating a coordinated return of the piston 30 and piston cylinder 28 to a reload position for the dispensing system 10.

Figure 3A:
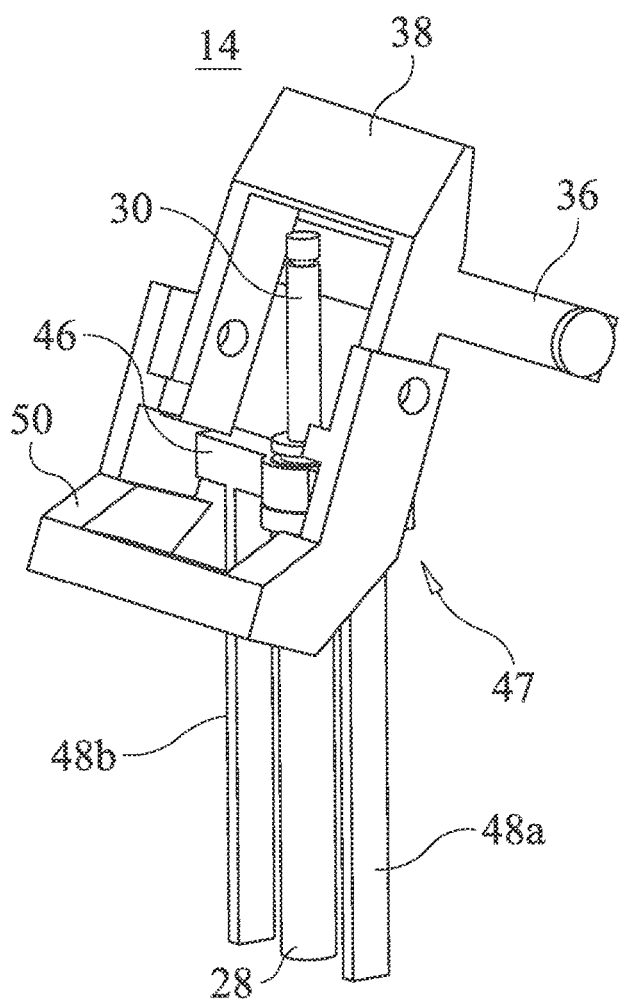
FIGS. 3A and 3B illustrate aspects of the operation of the air pressure mechanism shown in FIG. 2.
Figure 3B:
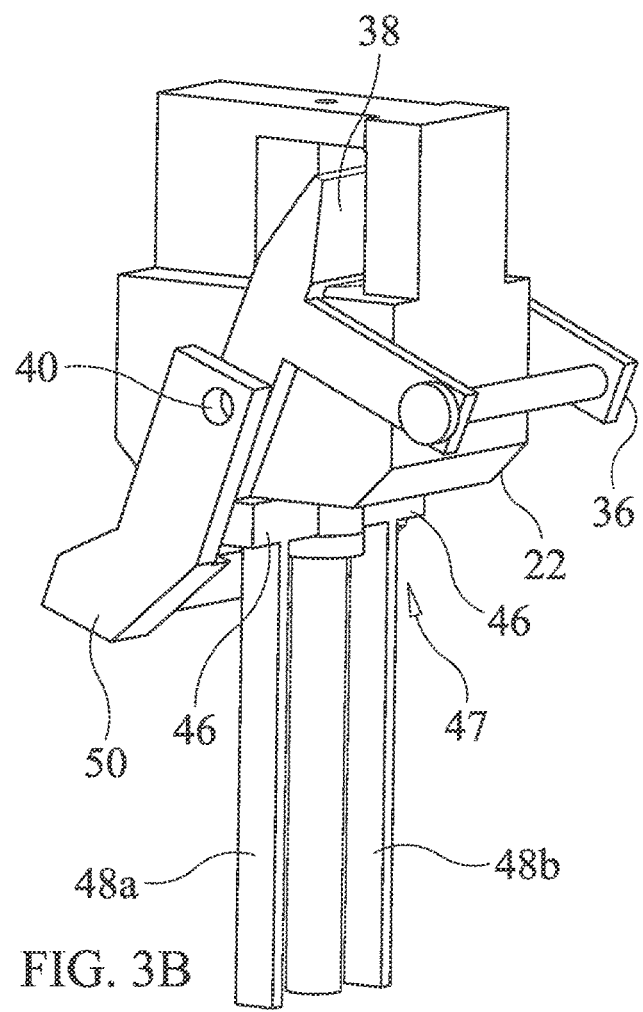

Now additionally referring to FIGS. 3A, 3B, 4A-4C, and 5A-5C, further operations of the dispensing system 10 are described. As indicated above, FIGS. 4A-4C illustrate aspects of the operation of the air pressure mechanism 14 and movements of the piston latch 38 during these processes. FIGS. 3A and 3B show aspects of a cylinder latch lock 47, arms 46, and valve arms 48*a*, 48*b* with (FIG. 3B) and without (FIG. 3A) the compress flange 22 in place, highlighting the location of the piston cylinder 28 and piston 30 relative to the piston latch 38 in order to better understand the operations highlighted in FIGS. 4A-4C.

Figure 5B:
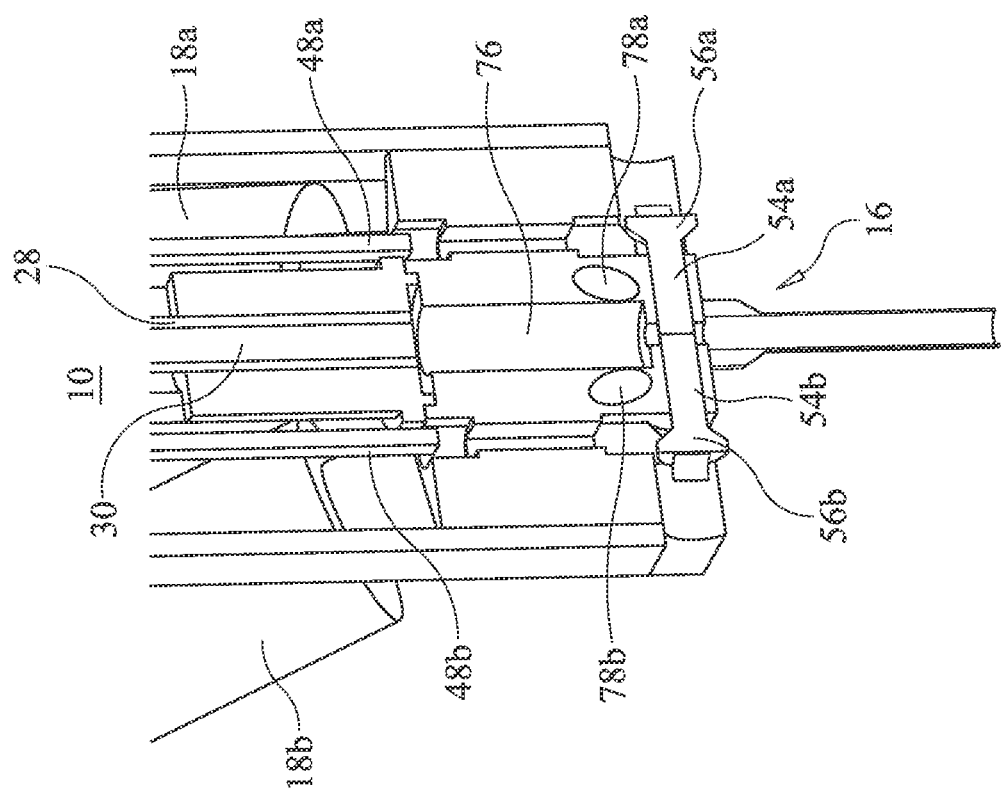

FIG. 4A illustrates a point in a dispensing cycle with return latch 50 and piston latch 38 both open. During this point, piston 30 and piston cylinder 28 are both "up," that is, they are both displaced within the compress flange 22 at the uppermost (or nearly so) position of their longitudinal travel. Consequently, as shown in FIGS. 5A and 5B, valve arms 48a, 48b are also in their "up" position and dispensing valve 16 is closed. At this time, fluid material may be introduced into chamber 76 (see FIG. 5B) via one or both of inlets 78a, 78b from the fluid material reservoirs 18a, 18b.

As mentioned above, inlets 78a, 78b may be machined so as to enhance mixing of the fluid material as it is introduced into chamber 76. For example, the inlets 78a, 78b may be helically shaped so as to cause mixing or swirling of the fluid material as it is introduced into the chamber 76, or some distortions may be added to otherwise smooth bore inlets to ensure good mixing of the fluid material and to avoid material phase separation. In one embodiment of the invention, the fluid material is introduced into chamber 76 from only one of the reservoirs 18a, 18b via its respective inlet 78a, 78b, and once the chamber 76 is full, excess fluid material flows into the other reservoir 18a, 18b via its respective inlet 78a, 78b. The inlets 78a, 78b and chamber 76 are all fluidly coupled to one another when the piston 30 and piston cylinder 28 are both in their respective "up" positions and the dispensing valve 16 is closed. Fluid material may be introduced into the chamber 76 and, optionally, into one of the reservoirs 18a, 18b, by pumping (e.g., with pressurized air or other means) the fluid material from one of the reservoirs 18a, 18b. Reservoirs 18a, 18b each include a respective port 80a, 80b to allow the reservoir to be filled with fluid material (e.g., from a common tank, not shown), and/or to have compressed air or fluid material introduced so as to force liquid material from the reservoir into the chamber 76, etc.

Once material has been introduced into chamber 76 of dispensing system 10, the dispensing process begins. With piston latch 38 in its open position (FIG. 4A), pressurized air is introduced into compress air piston cylinder 52, causing the compress air piston 20a to begin a downward stroke. The compress air piston 20a acts on the compress flange 22, moving the compress flange 22 down to act on arms 46 of cylinder latch lock 47 and plunger portion 66 of piston cylinder 28, thereby displacing the piston cylinder 28 longitudinally downwards in the cylinder holder 26. The end of the piston cylinder 28 protruding from the cylinder holder 26 is pushed down into the chamber 76 until it reaches the bottom of chamber 76, thereby enclosing/trapping a portion of the fluid material contained within chamber 76 (see FIG. 5C).

Referring to FIGS. 5B and 5C, as piston cylinder 28 moves longitudinally downwards, valve arms 48a, 48b push on lateral flanges 56a, 56b of the injection piston valves 54a, 54b disposed adjacent to the bottom of chamber 76. The lateral flanges 56a, 56b are shaped so that the downward, longitudinal motion of the valve arms 48a, 48b is translated to lateral motion of the injection piston valves 54a, 54b, forcing the injection piston valves 54a, 54b to move laterally outwards from the center of the injection cell 12 and opening the material exit 58 of dispensing valve 16.

At this point, the dispensing valve 16 is open, but the fluid material is still within chamber 76 and piston cylinder 28 of the dispensing system 10. Compress air piston 26a is returned to its starting position, causing the compress flange 22 to be returned to its original, uppermost position. Because the return latch 50 is in the open position, the piston cylinder 28 remains in its "down" position with the portion of the fluid material enclosed/trapped within the piston cylinder 28. Next, the piston latch 38 is closed. This is done via an upward stroke of latch air piston 20b, returning from its extended position to its compressed position. This causes cam 32 to be driven upwards by the distal end 34 of the latch air piston 20b, which in turn applies a torque on flange 36 in the "upwards" direction to close the piston latch 38. With piston latch 38 closed, pressurized air is again introduced into air piston cylinder 52 to cause the compress air piston 20a to begin another downward stroke.

The compress air piston 20a again acts on the compress flange 22, but because piston latch 38 is closed, the movement of compress flange 22 causes piston latch 38 to act on piston 30, thereby displacing the piston 30 longitudinally downwards in the cylinder holder 26 and piston cylinder 28. The piston 30 acts on the fluid material enclosed/trapped within the piston cylinder 28 during its downward stroke and because dispensing valve 16 is open, the downward longitudinal displacement of piston 30 expels the fluid material enclosed/trapped within the piston cylinder 28 through dispensing valve 16. Because the volume of fluid material enclosed/trapped within the piston cylinder 28 is approximately constant each time the piston cylinder 28 is lowered into its "down" position, the dispensing system 10 is able to dispense an approximately constant volume of fluid material each time the fluid material is dispensed.

Having thus dispensed a portion of the fluid material from the chamber 76 (i.e., the portion of the fluid material that was enclosed/trapped within the piston cylinder 28), the dispensing system 10 may be returned to its original state. To do so, the return latch 50 is closed, see FIG. 4C, and the compress air piston 20a is actuated to return to its unextended position. The closing of the return latch 50 may be effected by a spring or by a mechanical linkage coupled to a motor shaft. As compress air piston 20a begins its upward stroke to return to its unextended position, the piston cylinder 28 and piston 30 are both returned to their starting positions by being drawn up within the cylinder holder 26. The piston cylinder 28 and piston 30 move together because the closing of the return latch 50 engages the cylinder latch lock 47 so that as the compress flange 22 is drawn upwards by the compress air piston 20a, the piston cylinder 28 and piston 30 are also pulled up. This again opens the chamber 76 for refilling and also causes the closing of the dispensing valve 16. Because the arms 48a, 48b are drawn upwards with the piston cylinder 28 as a result of the upward stroke of the compress air piston 26a, the lateral flanges 56a, 56b of the injection piston valves 54a, 54b are no longer subject to lateral displacement and so the injection piston valves 54a, 54b (which are normally biased inwards, e.g., by springs or other biasing elements) come together and the material exit 58 is closed. When the piston cylinder 28 and piston 30 are in their starting "up" positions, the return latch 50 and the piston latch 38 are both opened and the dispensing system 10 is thus once again in the state represented in FIG. 4A.

In various embodiments of the invention, other types of dispensing valves can be used. For example, an iris- or flower-shaped valve that opens by pressing evenly on an outer cylinder or by a motorized opening mechanism may be employed. Such a motorized opening mechanism may also be employed using the dispensing valve 16 described above. Additionally, other compressing and reloading mechanisms can be used. For instance, a motor can be used to move the piston cylinder 28 and the piston 30 without the aid of pressurized air or in combination therewith.

Figure 6B:
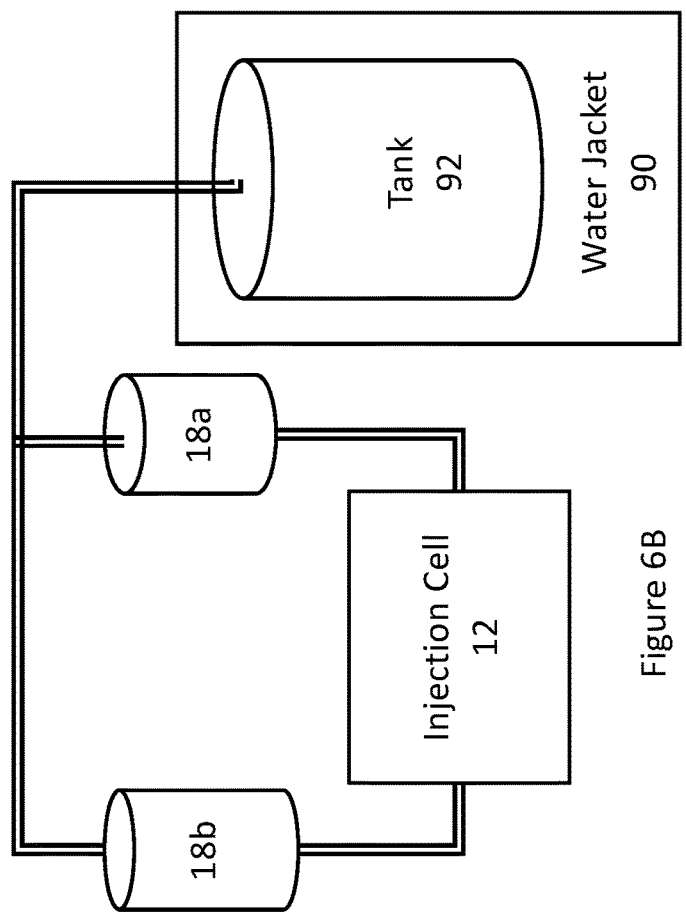
FIGS. 6A and 6B illustrate one or more temperature controlling elements of the dispensing system configured in accordance with embodiments of the present invention.
Figure 6A:
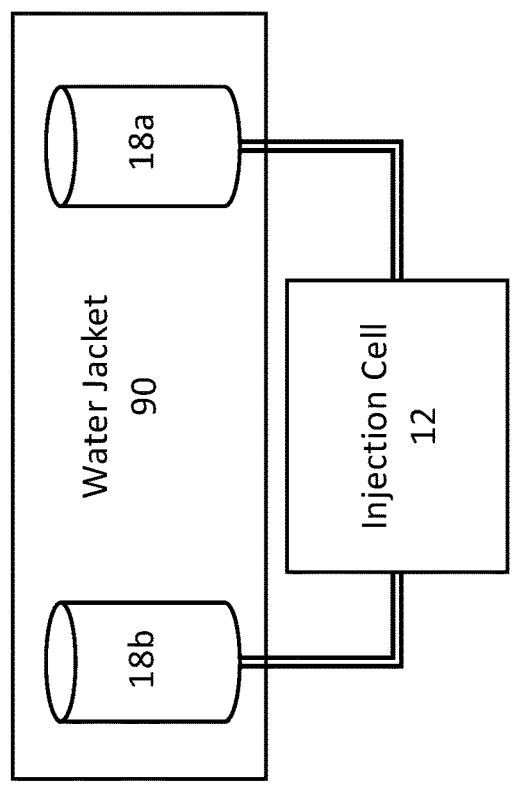

As mentioned above, the reservoirs 18a, 18b used to hold the fluid material prior to dispensing may be maintained at a constant temperature using a temperature-controlled surround, such as a water jacket. This ensures uniform properties of the to-be-dispensed fluid material, such as viscosity and density, thereby ensuring that accurate and repeatable volumes of the fluid material will be dispensed over a number of dispensing cycles. A dispenser 10 configured in such a manner is represented schematically in FIG. 6A. As shown, the reservoirs 18a, 18b are enclosed with a water jacket 90. Water or another liquid may be circulated within the water jacket so as to maintain a desired temperature of the fluid material in the reservoirs 18a, 18b. The injection cell 12 may or may not be enclosed in the water jacket 90. Of course, in other embodiments, separate water jackets may be used for the individual reservoirs 18a, 18b and/or the injection cell 12. An alternative arrangement is shown in FIG. 6B. In this example, a tank 92 that contains an amount of the fluid material for dispensing is fluidly coupled to each of reservoirs 18a, 18b. The fluid material in tank 92 is maintained at a constant temperature using a temperature-controlled surround, such as a water jacket 90. Fluid material is provided by tank 90 to the reservoirs 18a, 18b to be dispensed through injection cell 12 in the fashion discussed above. Of course, such an arrangement may be combined with that shown in FIG. 6A so that not only tank 92 but also the reservoirs 18a, 18b, and, optionally, the injection cell 12, are maintained at a constant temperature (e.g., in one or more water jackets). In lieu of a water jacket, one or more Peltier elements may be employed to regulate the temperature. Amounts of fluid material in either or both of the reservoirs 18a, 18b and/or the tank 92 may be measured by mechanical, electrical, optical or other means, for example, based on the height of the fluid material in the reservoirs 18a, 18b and/or tank 92.

Although not shown in detail, it should be understood that control of the above-described dispensing system, e.g., the operation of valves to effect the introduction of pressurized air and/or fluid material, as appropriate, may be effected using a processor-based controller with suitable programming to perform the above tasks. Such a controller may generally include a processor that executes computer-readable instructions (i.e., computer programs or routines) defining methods as described herein, which methods are instantiated as processor-executable instructions on non-transitory computer-readable media. Such methods may be rendered in any computer language and executed on any suitable programmable logic hardware. Processor-based controllers upon or with which the methods of the present invention may be practiced will typically include a bus or other communication mechanism for communicating information; a main memory, such as a random access memory ("RAM") or other dynamic storage device, coupled to the bus for storing information and instructions to be executed by the processor and for storing temporary variables or other intermediate information during execution of instructions to be executed by the processor; and a read only memory ("ROM") or other static storage device coupled to the bus for storing static information and instructions for the processor. A storage device, such as a hard disk or solid-state drive, may also be included and coupled to the bus for storing information and instructions. The subject controller may, in some instances, include a display coupled to the bus for displaying information to a user. In such instances, an input device, including an alphanumeric keyboard and/or other keys, may also coupled to the bus for communicating information and command selections to the processor. Other types of user input devices, such as cursor control devices may also be included and coupled to the bus for communicating direction information and command selections to the processor and for controlling cursor movement on the display. The controller may also include a communication interface coupled to the processor, which provides for two-way, wired and/or wireless data communication to/from the controller, for example, via a local area network (LAN). For example, the controller may be networked with a remote unit to provide data communication to a host computer or other equipment operated by a user. The controller can thus exchange messages and data with the remote unit, including diagnostic information to assist in troubleshooting errors, if needed.

Thus, systems and methods for dispensing accurate volumes of flowable substances, e.g., at a desired temperature and in a repeatable manner, have been described.

LIST OF REFERENCE NUMERALS

10 Dispensing system
12 Injection cell
14 Air pressure mechanism
16 Dispensing valve
18a, 18b Reservoir
20a Compress air piston
20b Latch air piston
22 Compress flange
24 Cylindrical interior
26 Cylinder holder
28 Circular piston cylinder
30 Piston
32 Cam
34 Distal end
36 Flange
38 Piston Latch
40 Pin
42 Piston head
44 Latch air piston cylinder
46 Arms
47 Cylinder latch lock
48a, 48b Valve arms
50 Return latch
52 Air piston cylinder
54a, 54b Injection piston valves
56a, 56b Lateral flanges
58 Material exit
60 Cavity
62 Upper end
64 Midpoint
66 Plunger portion
70 Upper end
72 Point
74 Inlet
76 Chamber
78a, 78b Inlet
80a, 80b Port
90 Water jacket
92 Tank

What is claimed is:

1. A dispensing system, comprising:
   a chamber that is fluidly coupled to two reservoirs of a fluid material and is configured to receive the fluid material from one or more of the two reservoirs; and
   a valve disposed adjacent to a bottom portion of the chamber, wherein the valve is configured to be opened during a dispensing operation to allow a portion of the fluid material from the chamber to be dispensed via the opened valve, wherein the valve comprises a first valve member and a second valve member, wherein the first valve member comprises a first lateral flange that is shaped so that a downward, longitudinal motion of a first valve arm is translated into a lateral motion of the first valve member, and wherein the second valve member comprises a second lateral flange that is shaped so that a downward, longitudinal motion of a second valve arm is translated into a lateral motion of the second valve member.

2. The dispensing system of claim 1, further comprising:
a piston cylinder; and
a piston carried within the piston cylinder,
wherein the piston cylinder is configured to be displaced into the chamber so as to contain the portion of the fluid material within the piston cylinder, and the piston is configured to be displaced within the piston cylinder so as to dispense the portion of the fluid material contained within the piston cylinder via the opened valve.

3. The dispensing system of claim 2, wherein the valve is opened simultaneously with the displacement of the piston cylinder into the chamber.

4. The dispensing system of claim 2, wherein the piston cylinder and the piston are configured to be longitudinally displaced together or are configured to be longitudinally displaced independently of one another.

5. The dispensing system of claim 2, further comprising a controllable latch that operably controls which of the piston cylinder and the piston undergoes longitudinal displacement.

6. The dispensing system of claim 2, further comprising a controllable latch configured to cause the piston cylinder and the piston to be longitudinally displaced together.

7. The dispensing system of claim 1, wherein the valve is configured to be opened and closed in a controllable manner with a motorized opening mechanism.

8. The dispensing system of claim 1, wherein an inlet from each of the two reservoirs to the chamber is configured to create a mixing of the fluid material before entry of the fluid material into the chamber.

9. The dispensing system of claim 1, further comprising additional reservoirs fluidly coupled to the chamber.

10. The dispensing system of claim 1, further comprising a temperature control element, wherein the two reservoirs are contained within the temperature control element, and wherein the temperature control element comprises one or more water jackets or one or more Peltier elements.

11. A method, comprising:
transferring, into a chamber of a dispensing system, fluid material from at least one of two reservoirs that are fluidly coupled to the chamber;
opening a valve of the dispensing system, wherein the valve is disposed adjacent to a bottom portion of the chamber, wherein the valve comprises a first valve member with a first lateral flange, and a second valve member with a second lateral flange, and wherein opening the valve comprises:
translating a first valve arm in a downward direction;
contacting the first lateral flange with the first valve arm;
translating the first valve member in a first lateral direction;
translating a second valve arm in a downward direction;
contacting the second lateral flange with the second valve arm; and
translating the second valve member in a second direction opposite to the first direction; and
dispensing a portion of the fluid material within the chamber through the opened valve of the dispensing system.

12. The method of claim 11, further comprising:
displacing, using an air piston, a piston cylinder into the chamber so as to contain the portion of the fluid material within the piston cylinder; and
displacing, using the air piston, a piston carried within the piston cylinder so as to dispense the portion of the fluid material contained within the piston cylinder through the opened valve of the dispensing system.

13. The method of claim 12, wherein the valve is opened simultaneously with the displacement of the piston cylinder into the chamber.

14. The method of claim 12, wherein the piston cylinder and the piston are longitudinally displaced together or are longitudinally displaced independently of one another.

15. The method of claim 12, further comprising positioning a latch in a first position or a second position, wherein in the first position, the piston cylinder is configured to be displaced without displacement of the piston, and wherein in the second position, the piston is configured to be displaced without displacement of the piston cylinder.

16. The method of claim 12, further comprising positioning a latch in a first position, wherein in the first position, the piston cylinder and the piston are configured to be longitudinally displaced together.

17. The method of claim 11, wherein the valve of the dispensing system is opened using a motorized opening mechanism.

18. The method of claim 11, wherein the fluid material is transferred into the chamber through respective inlets from each of the two reservoirs, the method further comprising mixing the fluid material within the respective inlets from each of the two reservoirs during the transfer of the fluid material into the chamber.

19. The method of claim 11, further comprising transferring additional fluid materials contained in additional reservoirs that are fluidly connected to the chamber, and mixing the fluid materials and the additional fluid materials within the chamber.

20. The method of claim 11, further comprising controlling a temperature of the fluid material in the two reservoirs with a temperature control element, wherein the temperature control element comprises one or more water jackets or one or more Peltier elements.

* * * * *